(12) United States Patent
Guadagnin et al.

(10) Patent No.: US 11,981,239 B2
(45) Date of Patent: May 14, 2024

(54) HEADREST EQUIPPED WITH LOUDSPEAKERS, AND ASSOCIATED SEAT

(71) Applicant: FOCAL JMLAB, La Talaudiere (FR)

(72) Inventors: Léo Guadagnin, Saint Chamond (FR); Arnaud Cazes Bouchet, Balbigny (FR)

( * ) Notice: Subject to any disclaimer, the term of this patent is extended or adjusted under 35 U.S.C. 154(b) by 0 days.

(21) Appl. No.: 18/032,498

(22) PCT Filed: Oct. 21, 2021

(86) PCT No.: PCT/FR2021/051850
§ 371 (c)(1),
(2) Date: Apr. 18, 2023

(87) PCT Pub. No.: WO2022/084636
PCT Pub. Date: Apr. 28, 2022

(65) Prior Publication Data
US 2023/0406185 A1 Dec. 21, 2023

(30) Foreign Application Priority Data
Oct. 22, 2020 (FR) ...................................... 2010836

(51) Int. Cl.
*B60N 2/879* (2018.01)
*B60R 11/02* (2006.01)
*B64D 11/00* (2006.01)
*B60R 11/00* (2006.01)

(52) U.S. Cl.
CPC .......... *B60N 2/879* (2018.02); *B60R 11/0223* (2013.01); *B64D 11/00154* (2014.12); *B60R 2011/0017* (2013.01); *B60R 2011/0043* (2013.01)

(58) Field of Classification Search
CPC .............. B60N 2/879; B64D 11/00154; B60R 11/0223; B60R 2011/0017; B60R 2011/0043
See application file for complete search history.

(56) References Cited

U.S. PATENT DOCUMENTS 5,133,017 A * 7/1992 Cain ................ G10K 11/17881
381/71.4
6,744,898 B1  6/2004 Hirano
(Continued)

FOREIGN PATENT DOCUMENTS

| CA | 2928995 A1 | 5/2015 |
| EP | 2858900 A1 | 4/2015 |

(Continued)

OTHER PUBLICATIONS

ISA/EPO International Search Report and Written Opinion for corresponding International Application No. PCT/FR2021/051850 dated Jan. 1, 2022 (9 pages).

*Primary Examiner* — Philip F Gabler
(74) *Attorney, Agent, or Firm* — Harris Beach PLLC

(57) ABSTRACT

The invention relates to a sound-equipped headrest comprising —at least one woofer associated with an open rear part, comprising a rear grid and/or open cell or semi-open cell foam with a density of between 8 and 60 kg/m³, so that said at least one woofer is two-directional; and —at least one mid-range/tweeter, associated with a closed rear part comprising a solid wall and/or a closed cell foam so that at least one mid-range/tweeter is mono-directional.

10 Claims, 7 Drawing Sheets

(56) References Cited

U.S. PATENT DOCUMENTS

| | | | |
|---|---|---|---|
| 8,130,987 B2* | 3/2012 | Kaneda | H04R 1/26 |
| | | | 381/301 |
| 9,792,892 B2* | 10/2017 | Gul | B60N 2/879 |
| 10,106,063 B2* | 10/2018 | Kim | B60N 2/5678 |
| 10,293,728 B2* | 5/2019 | Oswald | B60N 2/806 |
| 10,328,831 B2* | 6/2019 | Takada | H04R 1/025 |
| 2014/0284976 A1 | 9/2014 | Riedel et al. | |
| 2017/0156503 A1 | 6/2017 | Takada et al. | |
| 2021/0061152 A1* | 3/2021 | Servadio | B60N 2/879 |
| 2022/0353614 A1* | 11/2022 | Cai | H04R 5/02 |

FOREIGN PATENT DOCUMENTS

| | | |
|---|---|---|
| EP | 2910429 A1 | 8/2015 |
| JP | 2005027019 A | 1/2005 |
| KR | 100510294 B1 | 8/2005 |
| WO | WO-2006109389 A1 | 10/2006 |

\* cited by examiner

HEADREST EQUIPPED WITH LOUDSPEAKERS, AND ASSOCIATED SEAT

CROSS-REFERENCE TO RELATED APPLICATIONS

This application is a national stage application under 35. U.S.C. § 371 of PCT Application No. PCT/FR2021/051850, filed on Apr. 28, 2022, which claims priority to, and the benefit of, French Application No. 2010836 filed on Oct. 22, 2020, the entire contents of each application being incorporated herein by reference thereto.

TECHNICAL FIELD

The invention relates to the field of sound-equipped headrests, i.e., headrests with one or more built-in speakers to broadcast sounds for a person sitting on the seat upon which the headrest is mounted.

The invention may be of use in a large number of technical fields seeking to implement sound within a seat to form a bubble of sound around the person sitting in the seat so content different from one passenger to another may be played without disturbing one's neighbors.

For example, the invention may be used for airplane seats so that a passenger may listen to music or a movie without headphones and without disturbing neighbors.

In another example, the invention may be used in a car to play different sounds to the passengers or the driver.

PRIOR ART

In an airplane, audio content is offered to passengers to inform and/or entertain them during the course of the flight. Now, passengers have the opportunity to choose the audio content they wish to listen to, for example, a movie or music. To avoid disturbing neighboring passengers while listening to audio content, it is usually necessary to use headphones connected to an armrest on each passenger's seat. However, headphones are often uncomfortable, and the quality of the sound is often not optimal. The ability to play sounds without disturbing neighboring passengers, i.e., by forming a sound bubble around each passenger, is thus sought by means of speakers integrated directly into the headrest of passengers.

To this end, EP 2858900 proposes a sound-equipped headrest with a center zone padded with foam to support the back of a user's head. On either side of this central zone, lateral zones are rotatably mounted on hinges so that each lateral zone may be substantially moved towards a user's ear. Each lateral zone is provided with a speaker able to generate sounds as close as possible to the user's ears in order to limit the covered sound volume and, thus, limit the noise pollution for neighboring passengers. In other applications, such as car seats, the lateral zones are fixed relative to the center zone.

In any case, given the small surface available to integrate these speakers in the lateral zones, these speakers must have small membranes.

Solutions consisting of placing speakers closer to the user's ears are also described in JP2005027019, U.S. Pat. No. 6,744,898, and KR100510294. However, these solutions are particularly sensitive to the position of the user's head, and they only work effectively if the user's ears are precisely positioned in front of the speakers so that the volume emitted by these speakers may be reduced as much as possible to limit the environmental impact of the sound for neighbors.

However, user morphology may vary greatly, and these devices are configured to work effectively for an average user size. Thus, large or small users cannot use this system without having to amplify the sounds emitted to the maximum, which generates noise pollution for neighbors and causes very strong variations in the sound level perceived by the user during his head movements.

In addition, in these solutions, the speakers integrated into the lateral zones must be broadband. For the best sound quality, it is preferable to use several speakers specialized for different frequency ranges, e.g., one woofer and several speakers for the mid-range and high frequencies.

With the small area available in the lateral zones, the speakers used generally have a frequency range preferably between 80 Hz-400 Hz and 8 kHz-20 kHz, while the audible frequencies range between 20 Hz and 20 kHz for the average user.

Document WO2006/109389 proposes coupling two mid-range/tweeters placed close to the user's ears with a bass speaker placed under the seat to reproduce low frequencies at the level of a seat. Thus, the frequency spectrum of the sounds generated for the user is split so that the bass part of the sound is only generated by the bass speaker, and the mid-range/tweeter part of the sound is only generated by the mid-range/tweeters, close to the user's ears.

In order to reach the ears of the user with the woofer under the seat, the woofer has to be integrated into a box in order to obtain a one-way speaker. Indeed, the presence of a box makes it possible to promote the sound waves formed at the front of the membrane.

However, due to the long wavelengths and the compactness of the subwoofer, the formation of sound waves only towards the front surface of the bass speaker's membrane is only weakly directional, so the low frequencies of the woofer of document WO2006/109389 generate significant disturbances for neighbors before reaching the user's ear.

The technical problem that the invention proposes to solve is to obtain a headrest equipped with speakers with an efficient low-frequency sound reproduction while minimizing the environmental sound impact.

DISCLOSURE OF THE INVENTION

In order to solve this technical problem, the invention proposes to integrate at least one woofer into the headrest, associated with an open rear part, and at least one mid-range/tweeter, associated with a closed rear part.

Thus, in the case of the woofer, the rear acoustic wave generated by the displacement of the membrane interferes with the front acoustic wave. The woofer thus shows a monopolar behavior in the near field and a dipolar behavior in the far field.

In fact, in the far field, i.e., beyond 20 cm from the woofer, the interference between the waves coming from the front and the back of the woofer acts as a high-pass filter reducing the low-frequency sound level in front of and behind the woofer.

Because of the equidistance between the sounds emitted from the front and rear of the woofer, the sounds perceived at the sides of the woofer are strongly attenuated, and the woofer is considered to be bidirectional.

By placing the woofer directly behind the user's head, the user's ears are located in the near field of the woofer, and it is possible to reproduce low-pitched sounds without emitting significant noise pollution for neighbors located on the sides as well as in front of and behind the passenger, more than 20 or 30 cm away.

To this end, according to a first aspect, the invention relates to a headrest equipped with speakers comprising:
- at least one woofer associated with an open back, comprising a grid and/or a rear foam, with open or semi-open cells, having a density between 8 and 60 kg/m$^3$, so that said, at least one woofer is bi-directional; and
- at least one mid-range/tweeter, associated with a closed rear part comprising a solid wall and/or a closed cell foam, so that said at least one mid-range/tweeter is mono-directional.

In the sense of the invention, a monodirectional speaker corresponds to a speaker emitting a sound wave in a privileged direction. This characteristic is achieved by using the natural directivity of the transducers.

In the sense of this invention, a solid wall corresponds to a rear wall that does not have an opening in the part facing the speaker.

The invention makes it possible to obtain an effective sound reproduction for the entire sound spectrum audible by the human ear. Low frequencies are reproduced by means of at least one woofer, and mid-range and high frequencies are reproduced by means of the mid-range/tweeters. The speakers are distributed in the headrest so that the sound perceived by the user corresponds to the sum of the sound spectra generated by the different woofers and mid-range tweeters while limiting interference phenomena. In addition, the invention offers a particularly compact sound system since all the speakers are integrated into the reduced space of a headrest.

The invention also limits environmental noise impact because the woofer is configured to exhibit bi-directional far-field behavior, favoring sound attenuation for neighbors to the sides as well as in front of and behind the passenger, and the mid-range/tweeters are monodirectional, directed toward the user's ear.

In practice, the headrest includes:
- a central zone to provide support from the back of a user's head; said central zone having a front part comprising said at least one woofer covered by at least one front foam layer; and
- two lateral zones placed on either side of said central zone, each lateral zone integrating said at least one mid-range/tweeter.

According to a preferred embodiment, said lateral zones are mounted on either side of said central zone by means of hinges, so that said lateral zones are angularly orientable with respect to said central zone.

The number of speakers may vary depending on the application. For example, the central zone may incorporate one or two woofers depending on the available surface and the size of the speakers used.

Similarly, the headrest incorporates an array of at least two mid-range/tweeters spaced at a distance less than half the maximum of the wavelengths generated by said at least two mid-range/tweeters so as to achieve constructive interference between said at least two mid-range/tweeters and form a substantially cylindrical sound wave reaching the user's head.

In the sense of the invention, the distance between two speakers is defined as the distance measured between the centers of the membranes of each speaker.

In particular, the distance between the mid-range/tweeters is set for optimal coupling between 2 and 4 kHz. This embodiment proposes to use the constructive interference properties of speakers to form a substantially cylindrical sound wave.

All constructive and destructive interference is known as a "line array". They increase the directivity of the sounds emitted by the mid-range/tweeters along an axis perpendicular to the mid-range/tweeters. The resulting sound is, therefore, limited to the space formed by the "line array" and clearly attenuated in the other regions of the headrest.

In addition, the formation of a substantially cylindrical sound wave allows the tonal balance to be maintained over the entire height of the headrest so that the same quality of sound may be maintained for different positions of the user's head along the headrest and for forward and backward movements of the head.

Thus, with this embodiment, the headrest is less sensitive to user movement than systems of the prior art.

The integration of the woofer behind the user's head should not be done at the expense of the user's comfort. For this purpose, the woofer is covered by a layer of foam. For example, this front foam layer may be memory foam.

Similarly, said at least one mid-range/tweeter is covered by at least one front layer of foam.

To ensure transmission of sound waves through the foam, said at least one front foam layer of said central zone and said lateral zones comprise:
- a layer of primary foam with recesses facing said speakers; and
- a secondary foam layer on top of said primary foam layer.

The primary foam makes it possible to adjust the distance between the speakers and the front end of the headrest, while the secondary foam, preferably of lower thickness makes it possible to create a smooth surface for the headrest and to hide the recesses while ensuring comfort.

The size of the recesses in the primary foam layer may be adapted to the size of the membranes.

Thus, a recess may be centered on each mid-range/tweeter so that only the secondary foam layer limits the propagation of sound from the mid-range/tweeters. Preferably, this secondary foam layer has a lower density than the primary foam layer.

When the woofer is installed in the central part of the headrest, forming a recess, the size of the woofer is more complicated because the membrane has a larger surface area, and the sounds generated by the woofer may degrade the comfort of the user.

Preferably, said primary foam layer of said central zone has recesses positioned around the periphery of said at least one woofer.

Thus, a part of the primary foam layer facing the woofer has the function of limiting vibrations at the level of the user's head and ensuring effective support for the user's head.

In addition, the sound distribution between the mid-range/tweeters and the woofer may be defined according to the technical characteristics of the individual speakers. Preferably, said at least one woofer is controlled to diffuse sounds in a frequency range whose upper good range is between 80 and 800 Hz, advantageously at most 400 Hz. In this case, said at least one mid-range/tweeter of each lateral zone is controlled to play sounds in a frequency range greater than or equal to said upper limit, for example, a frequency range whose lower limit is 400 Hz.

This embodiment stems from an observation that sounds generated by mid-range/tweeters below 400 Hz are poorly directional, even with destructive interference. Thus, it is best to control the mid-range/tweeters to emit sounds only above 300 Hz to minimize the environmental noise impact. Also, the generation of sound above 300 Hz by a woofer is often problematic.

According to a second embodiment, the invention relates to a car, train, plane, or multimedia seat comprising:
a seat;
a backrest;
a headrest equipped with speakers, according to the first aspect of the invention, mounted on said backrest; and
a device to distribute the audio signal between said at least one woofer and said at least one mid-range/tweeter of said headrest equipped with speakers.

In the sense of the invention, a "multimedia chair" is an office chair intended for the practice of video games and integrating speakers to ensure the immersion of the player.

Thus, the sound distribution may be controlled by a dedicated device, for example, one that is built into the seat. This distribution element may perform a constant or variable distribution depending on one or more sensors. For example, a sensor may detect the position of the user's head over time so as to adapt the sound distribution if the user positions his or her head on a lateral zone instead of on the central zone. Also, the sound distribution element may automatically mute the sound when the passenger leaves the seat.

Preferably, said sound-equipped headrest comprises a plurality of mid-range/tweeters, said audio signal sound distribution element is configured to apply a time delay between at least two mid-range/tweeter speakers so as to direct the overall sound toward the ears of said user. This time delay allows the sound beam to be directed toward the user's ears. It may be carried out mechanically by the arrangement of the different speakers or digitally by the distribution element.

DESCRIPTION OF THE FIGURES

The manner of carrying out the invention, as well as the advantages derived therefrom, will become clear from the description of the following embodiments in support of the appended figures in which.

DETAILED DESCRIPTION OF THE INVENTION

As illustrated in FIGS. 1-6, a headrest 10a-10f has at least one central structure 13 for supporting the back of a user's head. In addition to this central structure 13, a headrest 10a-10f may include movable or non-movable lateral edges 14 for supporting the user's head 15 if the user moves his or her head 15 to either side of the headrest 10a-10f.

For example, the central structure 13 may have a parallelepiped shape with a height between 15 and 30 cm, a width between 20 and 50 cm, and a thickness between 5 and 20 cm.

The lateral edges 14 are mounted on either side of the central structure 13 by means of hinges 22, allowing the position of the lateral edges 14 to be angled. For example, the lateral edges 14 have a height between 15 and 30 cm, a width between 5 and 15 cm, and a thickness between 5 and 20 cm. The shape of the lateral edges 14 may be parallelepipedic, triangular, or oval without changing the invention. For example, in FIGS. 2, 4, and 5, the lateral edges 14 have a rectangular shape, while in FIG. 6, the lateral edges 14 have a trapezoidal, rectangular shape.

Figure 1:
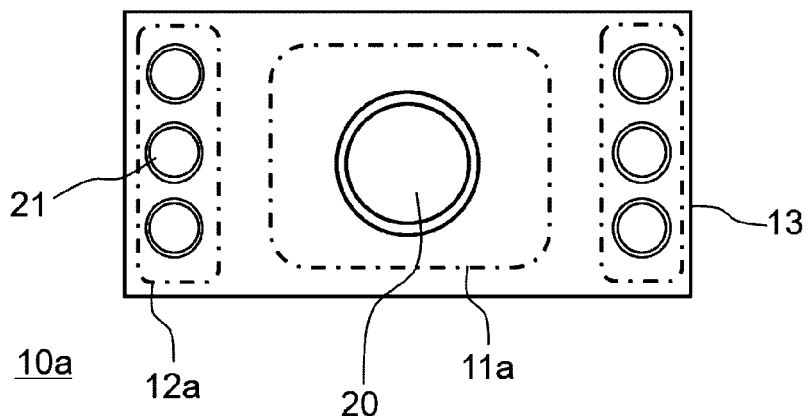
FIG. 1 is a schematic front view of a headrest according to a first embodiment of the invention.
Figure 2:
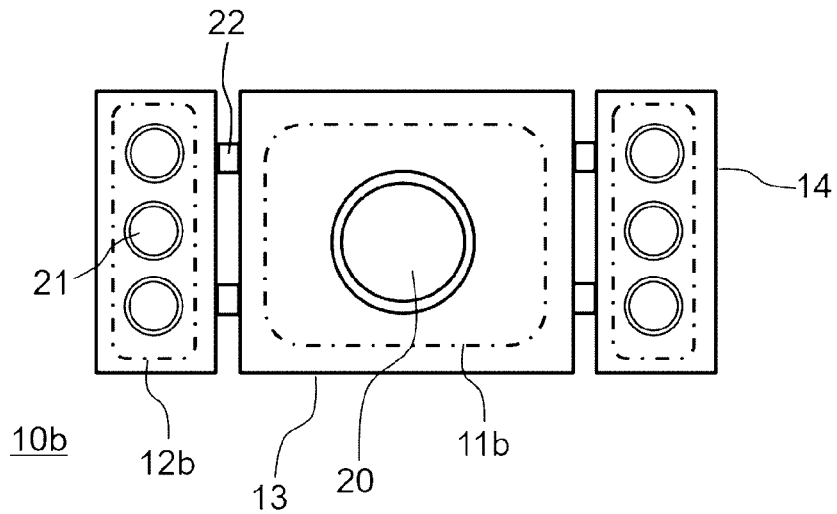
FIG. 2 is a schematic front view of a headrest according to a second embodiment of the invention.
Figure 3:
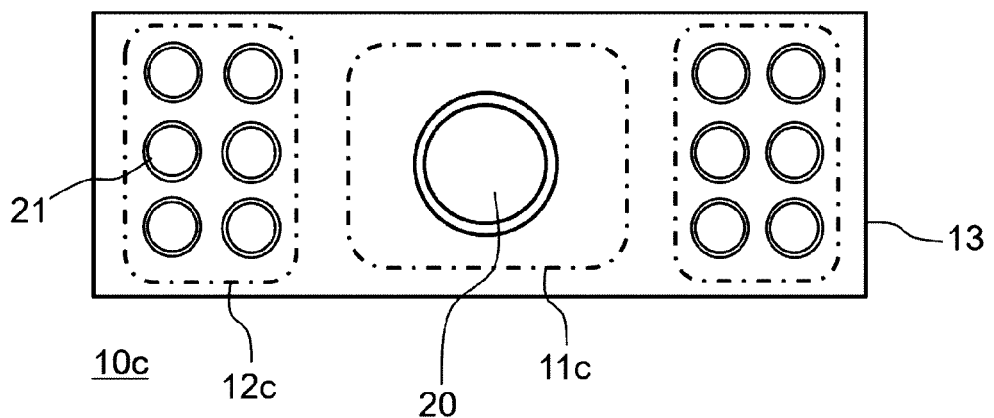
FIG. 3 is a schematic front view of a headrest according to a third embodiment of the invention.

The invention relates to the integration of speakers 20-21 into a headrest 10a-10E As shown in FIGS. 1-6, these speakers 20-21 may be integrated into the central structure 13 and/or the lateral edges 14. For example, all of the speakers 20-21 may be integrated into the central structure 13, as shown in FIGS. 1 and 3. Alternatively, all of the speakers 20-21 may be integrated into the lateral edges 14 (embodiment not shown), or the speakers 20-21 may be distributed between the central structure 13 and the lateral edges 14, as shown in FIGS. 2 and 4 through 6.

Preferably, the central structure 13 has a central zone 11a-11f for housing at least one woofer 20. This central zone 11a-11f is positioned substantially in the center of the central structure 13, close to the region where the head 15 of an average user is positioned.

Figure 4:
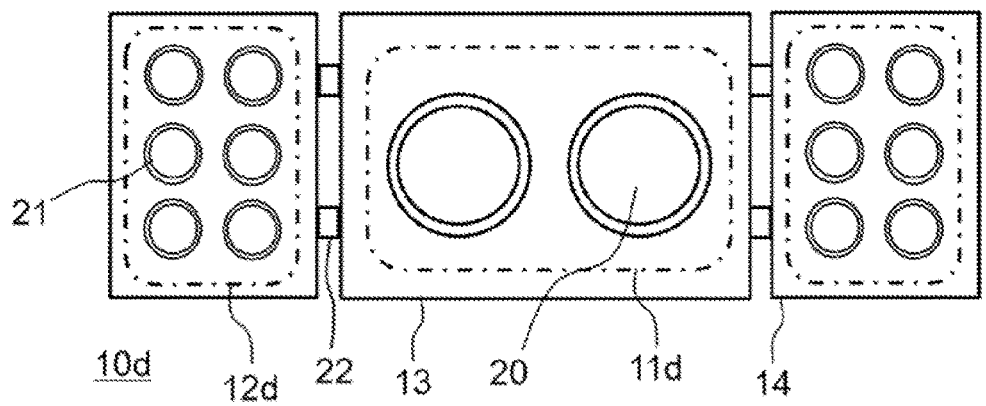
FIG. 4 is a schematic representation of the surface of a headrest according to a fourth embodiment of the invention.

In practice, several woofers 20 may be arranged in the central zone 11a-11f. FIG. 4 shows an embodiment in which two woofers 20 are positioned equidistant from the middle of the central zone 11d. This embodiment allows a woofer 20 to be positioned close to each user's ear.

The headrest 102-10f also has at least one lateral zone 12a-12f for housing at least one mid-range/tweeter 21. This lateral zone 12a-12f may be positioned in the central structure 13 and/or the lateral edges 14. Preferably, the headrest 10a-10f has two lateral zones, 12a-12f, positioned on either side of the central zone 11a-11f, close to the areas where the ears of the average user are positioned.

More specifically, in the case of FIGS. 1 and 3, lateral zones 12a, 12e are placed on either side of a central zone 11a, 11c. In addition, the central zone 11a, 11c and the lateral zones 12a, 12e are integrated into a single central structure 13.

Figure 6:
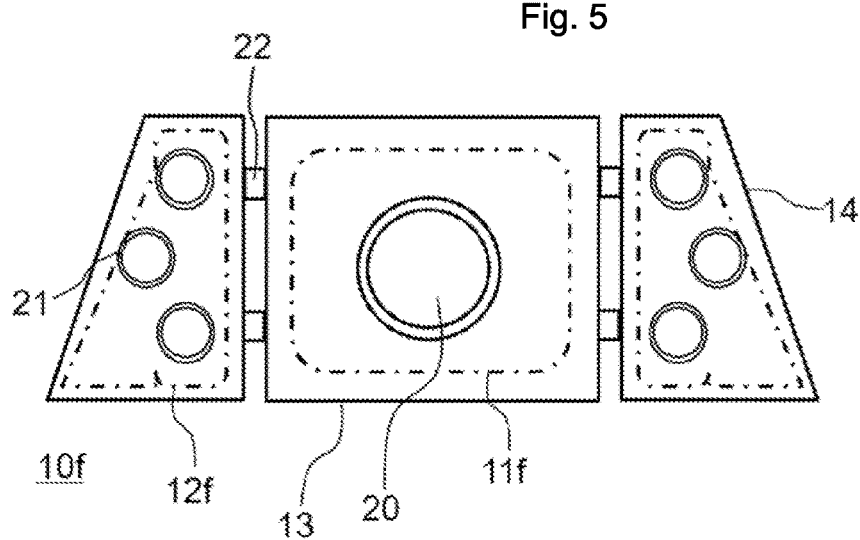
FIG. 6 is a schematic front view of a headrest according to a sixth embodiment of the invention.

In the case of FIGS. 2, 4, and 6, the lateral zones 12b, 12d, 12f are only placed on the lateral edges 14, Thus, only the central zone 11b, 11d, 11f is positioned in the central structure 13.

Figure 5:
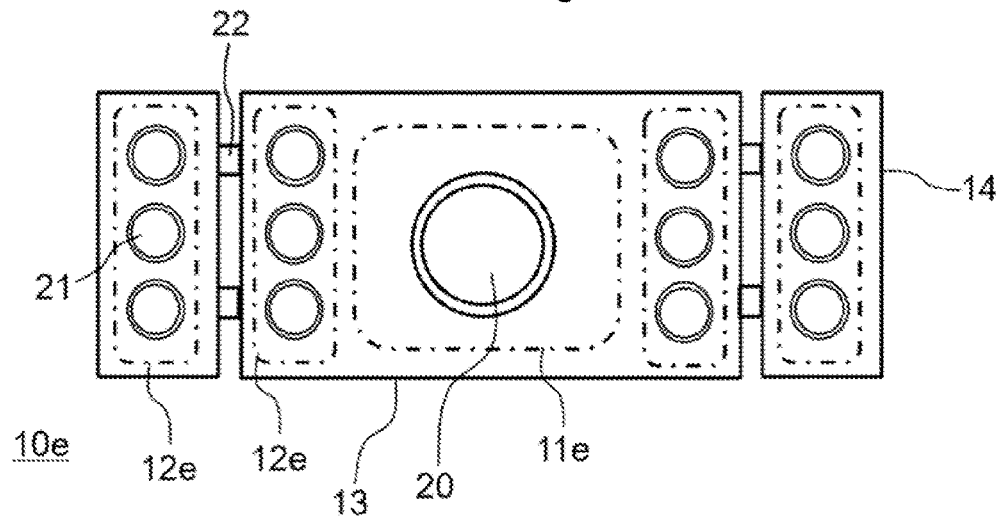
FIG. 5 is a schematic front view of a headrest according to a fifth embodiment of the invention.

In the case of FIG. 5, the lateral zones 12e are distributed between the lateral edges 14 and the central structure 13.

FIGS. 1 and 2 illustrate an embodiment in which the lateral zones 12a-12b have three mid-range/tweeters 21 aligned in a column, with a space between them of between 3 and 10 cm.

Alternatively, FIG. 6 illustrates an embodiment in which the three mid-range/tweeters 21 in each lateral zone 12f are positioned in a staggered manner.

In FIGS. 3 to 4, the lateral zones 12c-12d have two columns of three aligned mid-range/tweeters 21. FIG. 5 illustrates an embodiment in which the lateral zones 12e has two columns of three mid-range/tweeters 21, distributed between the lateral edges 14 and the central structure 13.

Indeed, in this embodiment of FIG. 5, a first column of three mid-range/tweeters 21 is present in the central structure 13, on either side of the central zone lie, and a second column of three mid-range/tweeters 21 is present on each lateral edge 14.

Preferably, the mid-range/tweeters 21 are spaced less than half the wavelength corresponding to the highest frequency reached by the mid-range/tweeters 21.

Thus, the number and placement of the mid-range/tweeters make it possible to form a "line-array", i.e., a sound system that produces a cylindrical and directive wave. Such a wave may be directed towards the user's ears so that the user is able to perceive the sound with a sufficient sound level and quality without disturbing neighbors. Alternatively, it is also possible to form a cylindrical wave by using a mid-range/tweeter 21 with a rectangular or oval-shaped membrane.

In particular, the greater the number of mid-range/tweeters 21, the more directive the resulting cylindrical sound wave.

Figure 13:
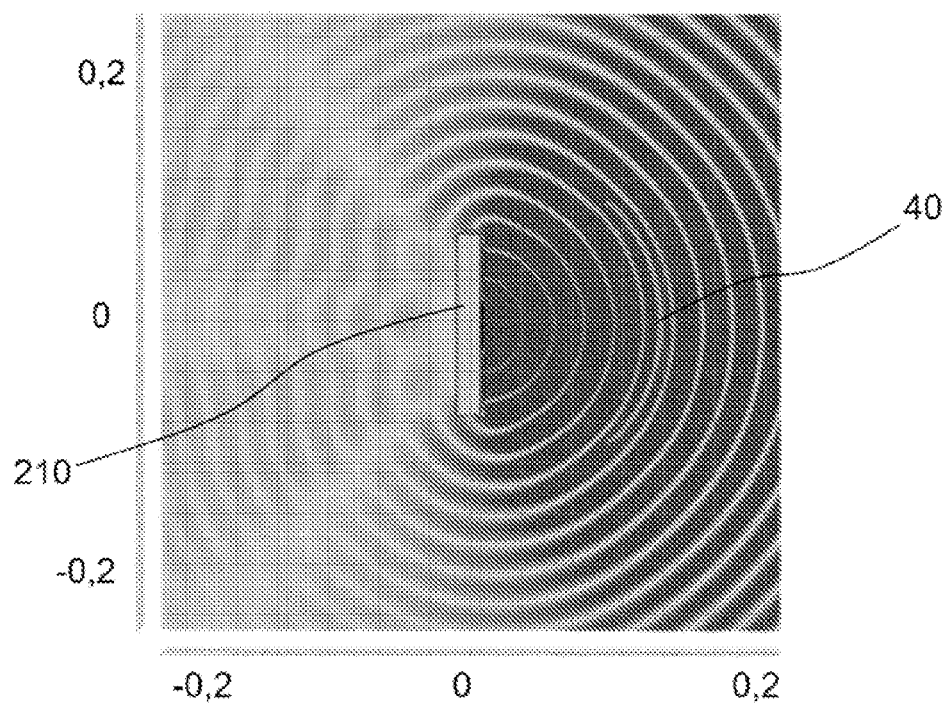
FIG. 13 is a representation of the sound waves generated by a single speaker.

As shown in FIG. 13, when a single mid-range/tweeter 210 is used, the resulting sound wave has a spherical wavefront 40. This type of wave is not very directional, i.e., the sound propagates in all directions and, in particular, towards the user's neighbors.

Figure 14:
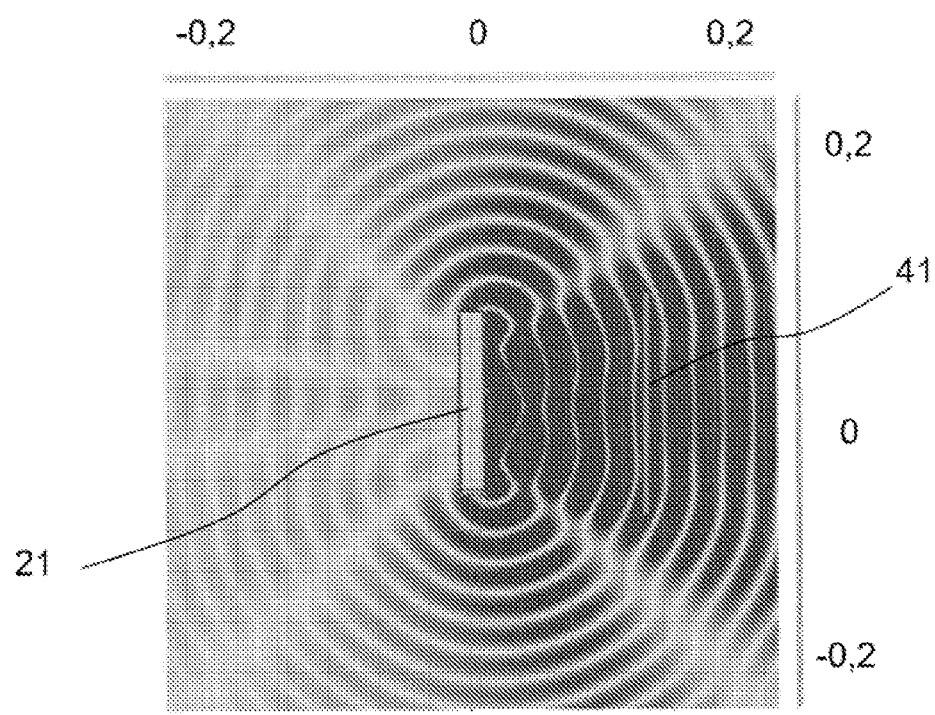
FIG. 14 is a representation of sound waves generated by an array of multiple speakers.

FIG. 14 shows the cylindrical wave generated by a "line array". This one has a plane wavefront 41. This type of wave is much more directive, i.e., the sound intensity depends on the direction. It appears, therefore, possible to orient the speakers so that the maximum sound intensity is received by the user and the minimum by the neighbors.

Figure 15:
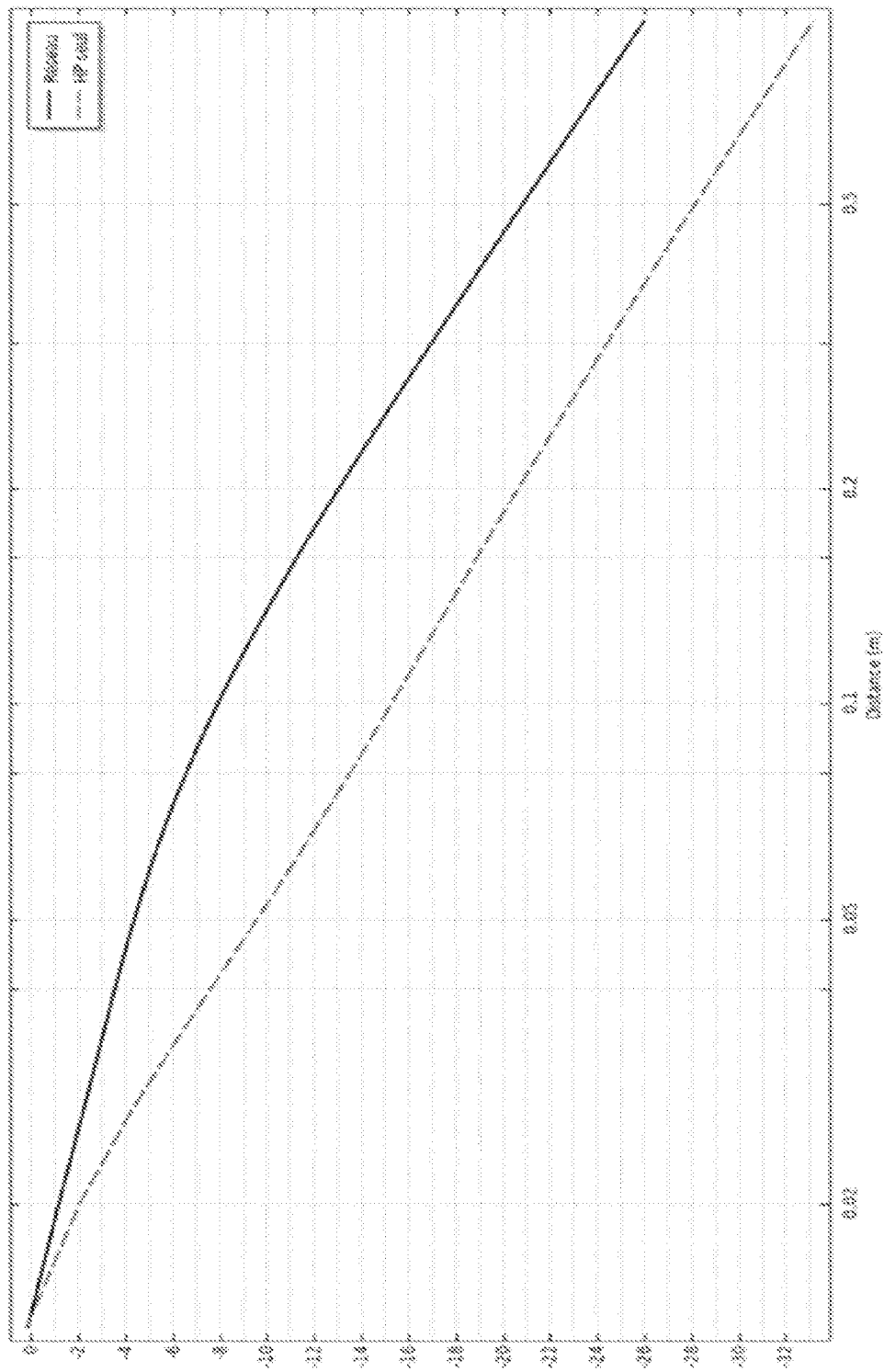
FIG. 15 is a comparison of the evolution of the attenuation of the sound intensity as a result of distance for a single speaker and an array of multiple speakers.

Furthermore, FIG. 15 reveals that, in the case of a single mid-range/tweeter 210, the intensity of sound decreases with respect to the distance from the mid-range/tweeter 210. Indeed, in the near field, typically between 0 and 2 cm from the speaker, the sound intensity decreases by 3 dB each time the distance to the speaker is doubled, and in the far field, typically from 2 cm from the speaker, the sound intensity decreases by 6 dB each time the distance to the speaker is doubled.

Therefore, the fluffier the user's ear is from the optimal position in front of the mid-range/tweeter 210, the more the sound is attenuated. Thus, a small movement of a user's head 15 may greatly diminish the quality of the sound.

In contrast, when an array of multiple mid-range/tweeters 21 is used, the sound intensity is essentially constant over a distance of 10 cm from the speaker. Thus, when the user's head 15 moves, the quality and intensity of the sound remain globally identical. Similarly, the arrangement of the mid-range/tweeters in a "line array" also makes it possible to maintain the same sound intensity over a height of between 10 and 25 cm along the headrest. As a result, all users, regardless of their size, will be able to enjoy a substantially constant sound quality.

Figure 7:
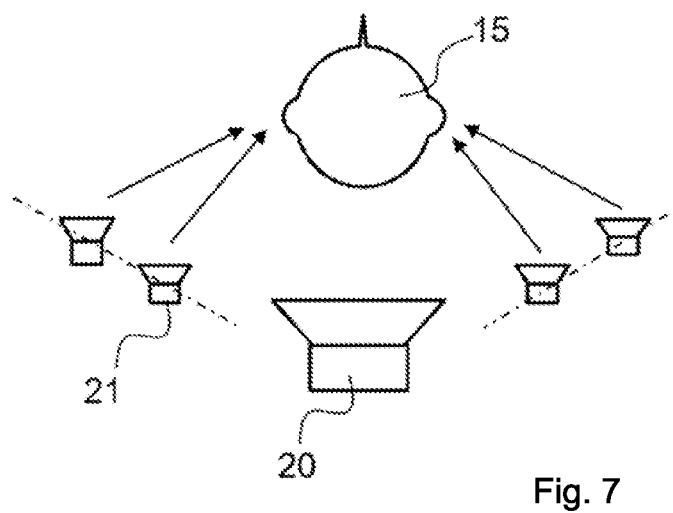
FIG. 7 is a schematic representation of a first positioning strategy for the headrest speakers in FIG. 3.
Figure 8:
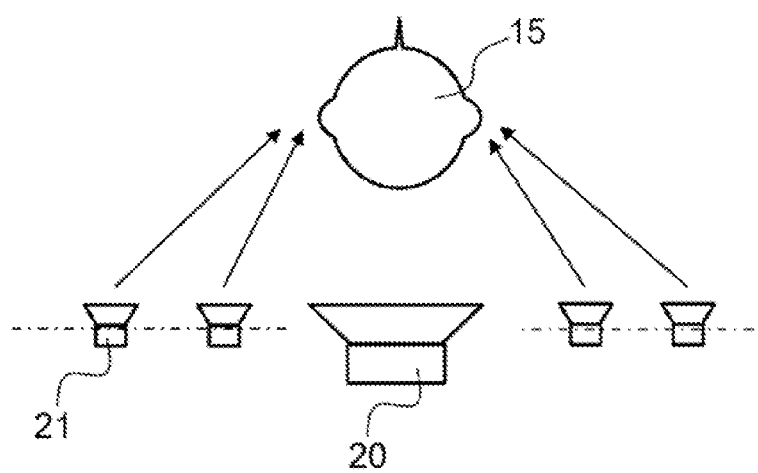
FIG. 8 is a schematic representation of a second positioning strategy for the headrest speakers in FIG. 3.

The use of a "line array" means that the sound wave propagates forward, which does not necessarily correspond to the direction of the user's ears. It is, therefore, preferable to direct the sound wave toward the user's ears. For example, adding a spatial or temporal delay may change the direction of the sound wave and direct it to the user's ears. FIGS. 7 and 8 illustrate two embodiments for obtaining this orientation of the sound wave.

The first solution consists of mechanically orienting the mid-range/tweeters 21. For example, if the mid-range/tweeters 21 are arranged on the lateral edges 14, the user may orient the lateral edges 14 to face their ears. Alternatively, the lateral edges 14 may be oriented in the opposite direction to that of the ears.

When it is impossible to mechanically orient the lateral edges 14, for example, in the case of a headrest 10a, 10c without lateral edges 14, the second solution consists of applying a time delay on the waves coming from the mid-range/tweeters 21. This solution thus requires that treatment be carried out on the sound. The distance to be covered by the sound wave for each mid-range/tweeter 21 may be estimated using a camera or an infrared sensor so as to detect the position of the user's head on the headrest 10a-10f and adapt the necessary time delay between the different mid-range/tweeters 21.

A hybrid solution consists of combining the two previous solutions, i.e., giving a predefined orientation to the mid-range/tweeters 21 and adding time delays on the waves coming from the mid-range/tweeters 21 to optimize the directivity if the orientation angle of the mid-range/tweeters 21 cannot be perfectly adjusted. The time delays may then be predefined or adjusted in real-time by using a position or head tracking sensor, which knows the orientation angle of the mid-range/tweeters 21.

Alternatively, it is also possible to adjust the directivity of the sound beam from the mid-range/tweeters 21 by adjusting the input gain of each mid-range/tweeter 21 in the array.

As shown in FIGS. 9-12, the headrest 10a-10f has at least one mounting plate 39 for supporting the speakers 20-21. The mounting plate 39 has the same cross-section as the central structure 13 and/or the lateral edges 14. It may be made of plastic, metal, wood, or any other material suitable for supporting the weight of the speakers 20-21.

The mounting plate 39 has openings for attaching the front of the speakers 20-21 and integrating them into the structure of the headrest 10a-10f. The speakers 20-21 are also linked to an acoustic filler that depends on the type and working frequency of the speakers 20-21.

A speaker 20-21 is typically formed by a membrane driven by a magnetic motor. A static part of the magnetic motor is fixed on the rear part of a frame. The membrane is attached to the front part of the frame by means of a suspension ring mounted between the front part of the frame and the outer edge of the membrane. To mount a speaker 20-21, this front part of the chassis may be mounted on the mounting plate 39, for example, by gluing, riveting, or by means of a screw.

For example, a woofer 20 may have a diaphragm with a diameter between 7 and 15 cm so as to produce sounds in a frequency range between 2 and 400 Hz, while a mid-range/tweeter 21 may have a diaphragm with a diameter between 0.5 and 10 cm, preferably between 0.5 and 5 cm, to produce sounds in a frequency range between 300 and 40,000 Hz.

Alternatively, the membrane may correspond to a rigid support or a closed cell foam with a thickness between 0.1 mm and 5 cm, which may cover all or part of the central zone 11a-11f. The rigid support or closed cell (non-porous) foam may be set in motion by a surface exciter positioned at the back of the rigid support. The vibrations of the support thus generate a sound. In practice, the associated open-back support 31 also provides a two-way woofer 20.

The rear part 31 of the headrest 10a-10f corresponds to the volume that extends from the magnetic motor of the speakers 20-21 in the direction opposite the position of the user's head 15. The front part 30 encompasses the membrane, the magnetic motor and extends in the direction of the user's head 15.

To provide an open back 31 for the at least one woofer 20, the back 31 must have at least one opening opposite the woofer 20, allowing the sound wave to propagate to the back of the woofer 20.

The invention proposes using an open or semi-open cell foam 33 and/or a box with an open grid 34 to obtain this open rear part 31.

Figure 9:
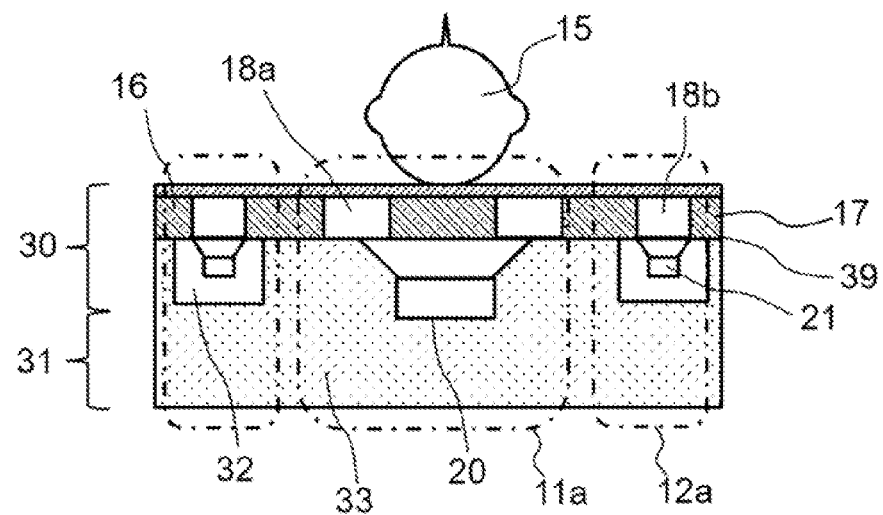
FIG. 9 is a schematic cross-sectional representation of the headrest of FIG. 1 according to a first embodiment of the open rear part.

As shown in FIG. 9, the rear part 31 may only include open-cell or semi-open-cell foam 33 to form the rear part of the headrest. Thus, the rear part 31 is open and allows the sound wave formed towards the rear part of the woofer 20 to propagate.

Figure 10:
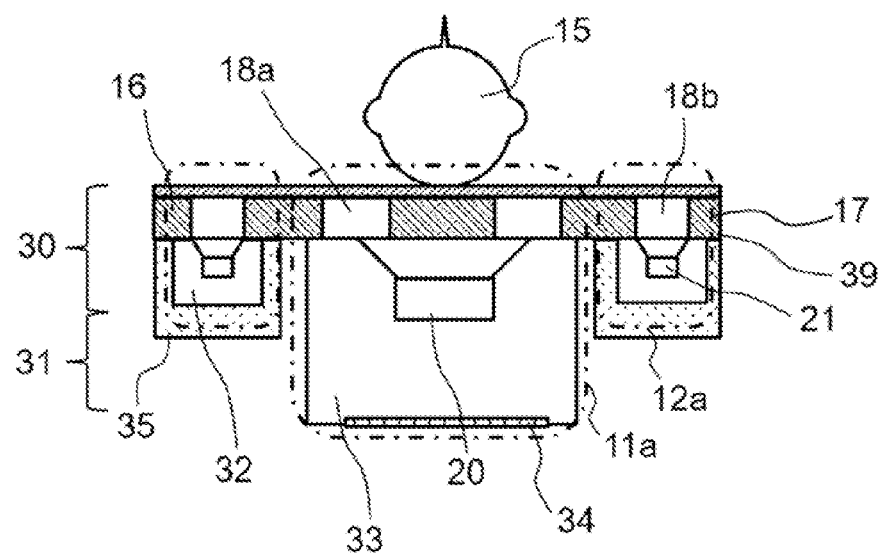
FIG. 10 is a schematic cross-sectional representation of the headrest of FIG. 1 according to a second embodiment of the open rear part.
Figure 11:
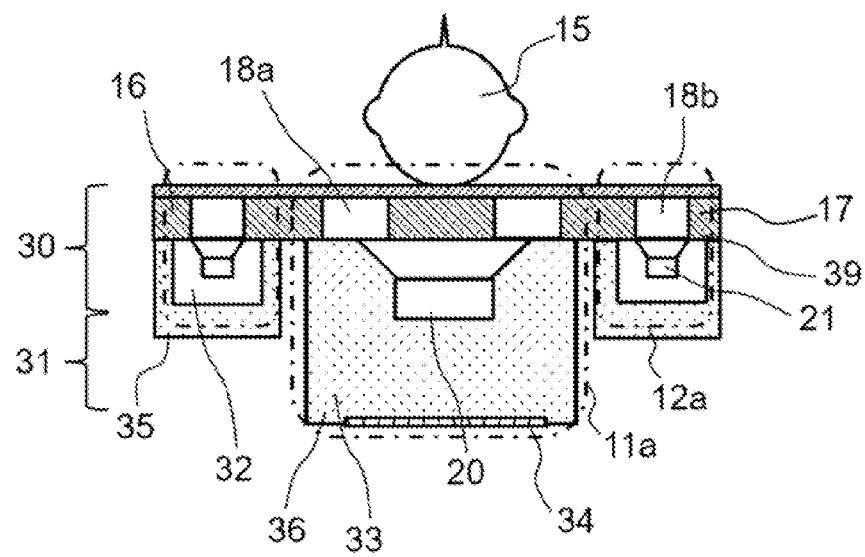
FIG. 11 is a schematic cross-sectional representation of the headrest of FIG. 1 according to a third embodiment of the open rear part.

As shown in FIGS. 10 and 11, the headrest frame 10a-10f may extend perpendicularly with respect to mounting plate 39 into the rear part 31 to form a box behind the woofer 20. The box is held open by a grid 34 placed opposite the woofer 20. A grid 34 is, for example, made of a plastic or metal mesh with openings of a few millimeters.

A rear foam 33 may be added to make the headrest 10a-10f more comfortable. However, it must be an open or semi-open cell. For example, a polyurethane rear foam 33 with a density between 8 and 60 kg/m3.

As an example, FIG. 9 illustrates a rear foam 33 covering the entire rear part of the central structure 13 to a thickness of between 2 and 15 cm.

The rear foam 33 is cut to fit directly onto the mounting plate 39 of the headrest 102-10f and to fit behind speakers 20-21 leaving as little gap as possible. The foam is mounted against the mounting plate 39 and the speakers 20-21 by means of glue, screws, or any other mounting means.

Alternatively, as shown in FIG. 11, the rear foam 33 may fill the space formed by the box behind the woofer 20.

Such an arrangement makes the woofers 20 monopolar in the near field and dipolar in the far field, i.e., the sound wave emitted by the woofers 20 propagates only forward, towards the user, and towards the rear. Thus, the sound is not perceived by the neighbors to the side. In addition, the neighbors in front and back do not perceive the sound as well because the wave attenuates quickly with the distance. Indeed, the dipolar behavior of the woofer 20 in the far field causes a high-pass filtering effect.

The mid-range/tweeters 21 are associated with a closed rear part 32. A closed rear part 32 is obtained thanks to a soundproof wall, typically made of wood or plastic and/or closed cell foam, i.e., with a density higher than 60 kg/m3. Typically, closed-cell foam may be made of polyethylene or polystyrene.

For example, FIG. 9 illustrates an enclosed rear wall 32 formed by a rigid box enclosing the magnetic motor of the at least one mid-range/tweeter 21. The rigid box may be covered by the rear foam 33 when the headrest 102-10f is formed only by a central structure 13.

Alternatively, as shown in FIGS. 10 and 11, when the mid-range/tweeters 21 are arranged on the lateral edges 14, the rigid enclosure may be covered with another type of foam 35, preventing sound propagation, typically a dense closed cell foam.

Such an arrangement makes the mid-range/tweeters 21 monodirectional, i.e., the sound wave emitted by the mid-range/tweeters 21 propagates in only one direction, the direction of the user's head 15. Thus, the neighbors to the side, front, and rear do not perceive the sound.

The front part 30 of the speakers 20-21 is covered by a first layer of front foam 16. The front foam 16 may have different characteristics depending upon the applications and the requirements for the desired comfort and support.

To efficiently pass the sound from speakers 20-21, it may be necessary to use recesses 18a-18b when the use of foams with low acoustic transmission properties is required. In particular, it is preferable to use recesses 18b the size of the speakers 21 to achieve the best possible acoustic transmission.

Alternatively, when the speakers 20 are of a large size, it may be preferable to use recesses smaller than the size of the speakers 20 so comfort is not compromised.

Figure 12:
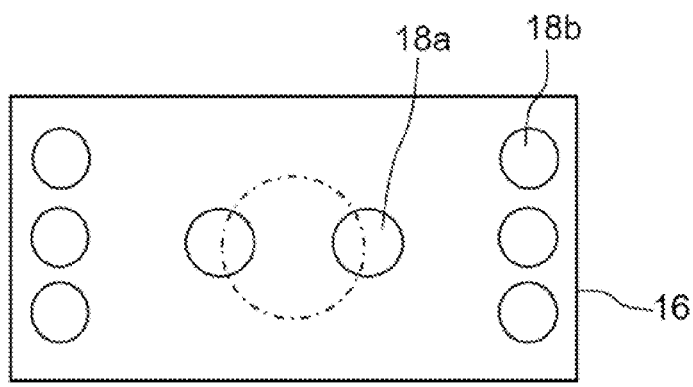
FIG. 12 is a schematic top view of the primary foam layer of the headrest in FIG. 1.

As shown in FIG. 12, a first layer of front foam 16, which is more rigid and dense than the rear foam 33, extends to a thickness of between 2 and 7 cm. Preferably, the first front foam layer 16 is pierced with recesses 18a-18b to improve sound diffusion to the user. In the case of the midrange/tweeter speakers 21, the recess 18b is provided opposite the midrange/tweeter speakers 21 because they are small enough in size that the opening does not reduce the comfort of the user. On the other hand, given the diameter and positioning of the woofers 20, it is preferable not to provide an opening directly in front of the woofer 20 because it is placed as close as possible to the user's head 15. When a recess is created behind the user's head 15, the area for providing support to the user's head 15 is reduced and the comfort of the user may be lost. For this purpose, the recesses 18a are preferably made in the periphery of the woofer speakers 20 and have a diameter between 2 and 8 cm.

A second front foam layer 17 covers the first front foam layer 16 and the speakers 20-21. This second front foam layer 17 is more flexible and lighter than the first front foam layer 16, typically 1 to 3 cm thick. Such a front foam 17 transmits the sound waves generated by the speakers 20-21 with little or no attenuation. This front foam layer 17 is added mainly for reasons of user comfort, for example, to limit the vibrations emitted by speakers 2041, and aesthetics, because the front foam 17 makes the surface of the headrest 10a-10f smooth and the presence of recesses 18a-18b imperceptible. For example, the second front foam layer 17 is a foam made of memory foam polyurethane, and the first front foam layer 16 is made of polyester fibers, for example, polyethylene terephthalate.

For questions of comfort and/or aesthetics, the front 17 and/or rear 3334 foams are covered with a fabric (not shown in the figures) that is preferably light and sound-permeable.

According to an embodiment not shown in the figures, headrest 102-10f is mounted on a seat by means of a hinge or metal rod mechanism capable of sliding vertically through guides drilled in the upper part of the seat back. Alternatively, headrest 10a-10f and the backrest are formed as one piece.

In conclusion, the invention makes it possible to obtain a headrest equipped with speakers with an effective sound reproduction in low frequencies while minimizing the environmental sound impact.

The invention claimed is:

1. A sound-equipped headrest comprising:
at least one woofer associated with an open back, comprising a grid and/or a rear foam, with open or semi-open cells, having a density between 8 and 60 kg/m³, so that said at least one woofer is bi-directional; and
at least one mid-range/tweeter, associated with a closed rear part comprising a solid wall and/or a closed cell foam, so that said at least one mid-range/tweeter is mono-directional.

2. The sound-equipped headrest according to claim 1, wherein the headrest comprises:
a central zone for receiving support from the back of a user's head; said central zone having a front portion, comprising said at least one woofer covered by at least one front foam layer; and
two lateral zones arranged on either side of said central zone; each lateral zone integrating said at least one mid-range/tweeter.

3. The sound-equipped headrest according to claim 2, wherein said lateral zones are mounted on either side of said central zone by means of hinges so that said lateral zones are angularly orientable with respect to said central zone.

4. The sound-equipped headrest according to claim 2, wherein said at least one front foam layer comprises:
a primary foam layer having recesses facing said at least one of said woofer and said mid-range/tweeter, and
a secondary foam layer placed on top of said primary foam layer.

5. The sound-equipped headrest according to claim 4, wherein said primary foam layer has recesses arranged at a periphery of said at least one woofer.

6. The sound-equipped headrest according to claim 1, wherein the headrest incorporates a network of at least two mid-range/tweeters spaced between 0.5 and 10 cm apart so as to achieve constructive interference between said at least two mid-range/tweeters and form a substantially cylindrical sound wave reaching a user's head.

7. The sound-equipped headrest according to claim 1, wherein said at least one mid-range/tweeter is covered by at least one front foam layer.

8. The sound-equipped headrest according to claim 1, wherein said at least one woofer is actuated to radiate sounds in a frequency range whose upper bound is between 80 and 800 Hz, and said at least one mid-range/tweeter of each lateral zone is actuated to radiate sounds in a frequency range whose lower bound is equal to or lower than said upper bound.

9. A car seat, train seat, plane seat, or multimedia seat including:
a seat;
a backrest;
a sound-equipped headrest, according to claim 1, mounted on said backrest; and
a mechanism for distributing an audio signal between said at least one woofer and said at least one mid-range/tweeter of said sound-equipped headrest.

10. The seat according to claim 9, wherein said headrest equipped with speakers having a plurality of mid-range/tweeters, said audio signal distribution mechanism is configured to apply a time delay between at least two mid-range/tweeters of each lateral zone so as to direct the overall audio signal in the direction of a user's ears.

* * * * *